(12) United States Patent
Byrne et al.

(10) Patent No.: US 10,541,557 B2
(45) Date of Patent: Jan. 21, 2020

(54) ELECTRICAL POWER CORD WITH INTELLIGENT SWITCHING

(71) Applicants: Norman R. Byrne, Ada, MI (US); Peter J. Maher, Grand Rapids, MI (US)

(72) Inventors: Norman R. Byrne, Ada, MI (US); Peter J. Maher, Grand Rapids, MI (US)

( * ) Notice: Subject to any disclaimer, the term of this patent is extended or adjusted under 35 U.S.C. 154(b) by 0 days.

(21) Appl. No.: 15/727,071

(22) Filed: Oct. 6, 2017

(65) Prior Publication Data

US 2018/0102673 A1    Apr. 12, 2018

Related U.S. Application Data

(60) Provisional application No. 62/405,480, filed on Oct. 7, 2016.

(51) Int. Cl.
*H02J 13/00* (2006.01)
*H04B 3/54* (2006.01)
*H03K 17/945* (2006.01)

(52) U.S. Cl.
CPC .......... *H02J 13/0079* (2013.01); *H04B 3/546* (2013.01); *H04B 2203/5458* (2013.01)

(58) Field of Classification Search
CPC ......... H02J 13/0079; H04B 2203/5458; H04B 3/546
See application file for complete search history.

(56) References Cited

U.S. PATENT DOCUMENTS 2,234,982 A    3/1941  Ross
2,573,920 A    11/1951 McLeod
(Continued)

FOREIGN PATENT DOCUMENTS

CN    201570900    9/2010
CN    101873009    10/2010
(Continued)

OTHER PUBLICATIONS

Power Integrations, Inc., "Tiny Switch Flyback Design Methodology—Application Note AN-23," dated Jul. 1999.
(Continued)

*Primary Examiner* — Jared Fureman
*Assistant Examiner* — Esayas G Yeshaw
(74) *Attorney, Agent, or Firm* — Gardner, Linn, Burkhart & Ondersma LLP (57) ABSTRACT

An electrical power cord includes intelligent switching capability. An electrical power input receives electrical power from a power source, and selectively conveys that power to an electrical power output only when certain occupancy or power usage criteria are met. The electrical power output conveys electrical power to an electrical consumer when a switch disposed along the power cord is closed. The switch is actuated in response to a signal received from a sensor, such as an occupancy sensor or a power consumption sensor, and breaks continuity along the power cord when signals received from the sensor indicate that the occupancy or power usage criteria are not being met, which criteria may be customized for a particular application. The electrical power cord is operable to automatically reduce or substantially eliminate power consumption at its power output end.

20 Claims, 4 Drawing Sheets

(56) References Cited

U.S. PATENT DOCUMENTS

| | | |
|---|---|---|
| 3,214,734 A | 10/1965 | Whitehead |
| 3,339,079 A | 8/1967 | Kessler |
| 3,363,214 A | 1/1968 | Wright |
| 3,521,216 A | 7/1970 | Tolegian |
| 3,766,434 A | 10/1973 | Sherman |
| 3,786,391 A | 1/1974 | Mathauser |
| 3,808,577 A | 4/1974 | Mathauser |
| 3,810,258 A | 5/1974 | Mathauser |
| 3,813,579 A | 5/1974 | Doyle et al. |
| 3,944,891 A | 3/1976 | McDonald et al. |
| 3,993,977 A | 11/1976 | Gilbert |
| 3,994,552 A | 11/1976 | Selvin |
| 4,004,298 A | 1/1977 | Freed |
| 4,023,073 A | 5/1977 | Georgi |
| 4,112,941 A | 9/1978 | Larimore |
| 4,161,727 A | 7/1979 | Thilo et al. |
| 4,175,238 A | 11/1979 | Breimesser et al. |
| 4,370,562 A | 1/1983 | Palazzetti et al. |
| 4,399,371 A | 8/1983 | Ziff et al. |
| 4,462,656 A | 7/1984 | Beyer |
| 4,499,385 A | 2/1985 | Slavik |
| 4,520,417 A | 5/1985 | Frank |
| 4,575,714 A | 3/1986 | Rummel |
| 4,580,862 A | 4/1986 | Johnson |
| 4,706,159 A | 11/1987 | Hafner |
| 4,720,758 A | 1/1988 | Winslow |
| 4,731,549 A | 3/1988 | Hiddleson |
| 4,757,416 A | 7/1988 | Wilkerson |
| 4,760,276 A | 7/1988 | Lethellier |
| 4,985,806 A | 1/1991 | Mazzullo et al. |
| 5,037,322 A | 8/1991 | Adams |
| 5,071,363 A | 12/1991 | Reylek et al. |
| 5,083,042 A | 1/1992 | Merchant |
| 5,138,185 A | 8/1992 | Weinstock |
| 5,157,273 A | 10/1992 | Medendorp et al. |
| 5,164,609 A | 11/1992 | Poppe et al. |
| 5,164,916 A | 11/1992 | Wu et al. |
| 5,172,008 A | 12/1992 | Odagiri |
| 5,199,892 A | 4/1993 | campbell et al. |
| 5,203,711 A | 4/1993 | Bogiel |
| 5,203,712 A | 4/1993 | Kilpatrick et al. |
| 5,208,485 A | 5/1993 | Krinsky et al. |
| 5,270,576 A | 12/1993 | Kahle |
| 5,302,857 A | 4/1994 | Charles et al. |
| 5,359,540 A | 10/1994 | Ortiz |
| 5,401,175 A | 3/1995 | Guimond et al. |
| 5,424,903 A | 6/1995 | Schreiber |
| 5,436,788 A | 7/1995 | Wallaert |
| 5,481,607 A | 1/1996 | Hsiao |
| 5,572,438 A | 11/1996 | Ehlers et al. |
| 5,575,668 A | 11/1996 | Timmerman |
| 5,589,718 A | 12/1996 | Lee |
| 5,604,385 A | 2/1997 | David |
| 5,621,256 A | 4/1997 | Crane et al. |
| 5,637,933 A | 6/1997 | Rawlings et al. |
| 5,644,461 A | 7/1997 | Miller et al. |
| 5,684,469 A | 11/1997 | Toms et al. |
| 5,691,750 A | 11/1997 | Edwards |
| 5,708,551 A | 1/1998 | Bosatelli |
| 5,708,554 A | 1/1998 | Liner |
| 5,745,670 A | 4/1998 | Linde |
| 5,752,845 A | 5/1998 | Fu |
| 5,754,384 A | 5/1998 | Ashley |
| 5,781,744 A | 7/1998 | Johnson et al. |
| 5,815,353 A | 9/1998 | Schwenkel |
| 5,855,494 A | 1/1999 | Blaszczyk et al. |
| 5,880,677 A | 3/1999 | Lestician |
| 5,885,109 A | 3/1999 | Lee et al. |
| 5,909,100 A | 6/1999 | Watanabe et al. |
| 5,914,539 A | 6/1999 | Borgmann et al. |
| 5,921,783 A | 7/1999 | Fritsch et al. |
| 5,923,103 A | 7/1999 | Pulizzi et al. |
| 5,954,520 A | 9/1999 | Schmidt |
| 5,967,820 A | 10/1999 | Siegal et al. |
| 6,007,344 A | 12/1999 | Corrunker et al. |
| 6,028,267 A | 2/2000 | Byrne |
| 6,031,302 A | 2/2000 | Levesque |
| 6,046,513 A | 4/2000 | Jouper et al. |
| 6,049,143 A | 4/2000 | Simpson et al. |
| 6,157,555 A | 12/2000 | Hemena et al. |
| 6,162,062 A | 12/2000 | Liao |
| 6,179,665 B1 | 1/2001 | Rossman et al. |
| 6,184,483 B1 | 2/2001 | Coudert et al. |
| 6,211,796 B1 | 4/2001 | Toms et al. |
| 6,250,931 B1 | 6/2001 | Mendelson |
| 6,290,518 B1 | 9/2001 | Byrne |
| 6,330,176 B1 | 12/2001 | Thrap |
| 6,356,826 B1 | 3/2002 | Pohjola |
| 6,366,927 B1 | 4/2002 | Meek et al. |
| 6,379,164 B1 | 4/2002 | Cash, Jr. |
| 6,385,547 B1 | 5/2002 | Bogli |
| 6,417,657 B2 | 7/2002 | Azuma et al. |
| 6,420,877 B1 | 7/2002 | Replogle |
| 6,428,334 B1 | 8/2002 | Skarie et al. |
| 6,469,404 B1 | 10/2002 | Pohjola |
| 6,478,614 B1 | 11/2002 | De'Longhi |
| 6,497,579 B1 | 12/2002 | Garbini |
| 6,508,663 B1 | 1/2003 | Uusimaki |
| 6,552,888 B2 | 4/2003 | Weinberger |
| 6,558,177 B2 | 5/2003 | Havener et al. |
| 6,561,815 B1 | 5/2003 | Schmidt |
| 6,624,991 B2 | 9/2003 | Chu |
| 6,633,434 B2 | 10/2003 | Hollander |
| 6,633,472 B2 | 10/2003 | Lai |
| 6,642,852 B2 | 11/2003 | Dresti et al. |
| 6,660,950 B2 | 12/2003 | Fonseca |
| 6,700,333 B1 | 3/2004 | Hirshi et al. |
| 6,733,317 B2 | 5/2004 | Sato |
| 6,741,442 B1 | 5/2004 | McNally et al. |
| 6,768,225 B2 | 7/2004 | Chang et al. |
| 6,786,765 B2 | 9/2004 | Bauermeister et al. |
| 6,798,227 B1 | 9/2004 | Hwang |
| 6,808,405 B1 | 10/2004 | Uratani et al. |
| 6,813,525 B2 | 11/2004 | Reid et al. |
| 6,815,842 B2 | 11/2004 | Fehd et al. |
| 6,857,896 B2 | 2/2005 | Rupert et al. |
| 6,870,463 B2 | 3/2005 | Dresti et al. |
| 6,984,153 B2 | 1/2006 | Lai et al. |
| 7,058,482 B2 | 6/2006 | Fletcher et al. |
| 7,058,524 B2 | 6/2006 | Hayes et al. |
| 7,059,882 B2 | 6/2006 | Sugita et al. |
| 7,066,739 B2 | 6/2006 | McLeish |
| 7,075,769 B2 | 7/2006 | Rupert et al. |
| 7,090,521 B2 | 8/2006 | Nishio et al. |
| 7,099,966 B2 | 8/2006 | Chan et al. |
| 7,129,599 B2 | 10/2006 | Divan et al. |
| 7,141,891 B2 | 11/2006 | McNally et al. |
| 7,171,461 B2 | 1/2007 | Ewing et al. |
| 7,184,848 B2 | 2/2007 | Krzyzanowski et al. |
| 7,192,289 B2 | 3/2007 | Kowalski |
| 7,219,243 B2 | 5/2007 | Lim |
| 7,249,960 B2 | 7/2007 | Annecke et al. |
| 7,259,950 B2 | 8/2007 | Chen |
| 7,262,943 B2 | 8/2007 | Stellato et al. |
| 7,264,479 B1 | 9/2007 | Lee |
| 7,269,521 B2 | 9/2007 | Hsu et al. |
| 7,311,526 B2 | 12/2007 | Rohrbach et al. |
| 7,311,541 B2 | 12/2007 | Chien et al. |
| 7,344,380 B2 | 3/2008 | Neidlein et al. |
| 7,351,066 B2 | 4/2008 | DiFonzo et al. |
| 7,380,142 B2 | 5/2008 | Lee et al. |
| 7,404,726 B1 | 7/2008 | Herring et al. |
| 7,409,270 B2 | 8/2008 | Schibli et al. |
| 7,424,569 B2 | 9/2008 | Matsuda |
| 7,462,066 B2 | 12/2008 | Kohen |
| 7,463,124 B2 | 12/2008 | DiSalvo et al. |
| 7,467,948 B2 | 12/2008 | Lindenberg et al. |
| 7,497,273 B2 | 3/2009 | Schoettle |
| 7,500,862 B1 | 3/2009 | Herring et al. |
| 7,500,882 B2 | 3/2009 | Goetz et al. |
| 7,504,745 B2 | 3/2009 | Lee |
| 7,517,222 B2 | 4/2009 | Rohrbach et al. |
| 7,528,504 B2 | 5/2009 | Gerber |
| 7,555,365 B2 | 6/2009 | Bhakta |

(56) References Cited

U.S. PATENT DOCUMENTS

| | | |
|---|---|---|
| 7,602,083 B1 | 10/2009 | Flegel et al. |
| 7,606,014 B2 | 10/2009 | Ziegler et al. |
| 7,607,920 B1 | 10/2009 | Chen |
| 7,619,868 B2 | 11/2009 | Spitaels et al. |
| 7,622,822 B2 | 11/2009 | Gelonese |
| 7,641,476 B2 | 1/2010 | Didur et al. |
| 7,641,477 B2 | 1/2010 | DiFonzo et al. |
| 7,641,510 B2 | 1/2010 | Byrne |
| 7,645,143 B2 | 1/2010 | Rohrbach et al. |
| 7,648,379 B2 | 1/2010 | Johnson et al. |
| 7,657,763 B2 | 2/2010 | Nelson |
| 7,658,612 B2 | 2/2010 | Lee et al. |
| 7,658,613 B1 | 2/2010 | Griffin et al. |
| 7,697,268 B2 | 4/2010 | Johnson et al. |
| 7,726,974 B2 | 6/2010 | Shah et al. |
| 7,741,806 B2 | 6/2010 | Kuhlmann et al. |
| 7,765,416 B2 | 7/2010 | Zhou |
| 7,772,717 B2 | 8/2010 | Kitamura et al. |
| 7,775,801 B2 | 8/2010 | Shiff et al. |
| 7,800,252 B2 | 9/2010 | DuBose et al. |
| 7,826,202 B2 | 11/2010 | Johnson et al. |
| 7,834,486 B1 | 11/2010 | Flegel et al. |
| 7,840,383 B2 | 11/2010 | Wang |
| 7,841,776 B2 | 11/2010 | DiFonzo et al. |
| 7,841,865 B2 | 11/2010 | Maughan et al. |
| 7,888,821 B2 | 2/2011 | Flegel et al. |
| 7,901,216 B2 | 3/2011 | Rohrbach et al. |
| 7,905,737 B2 | 3/2011 | Byrne |
| 7,905,749 B2 | 3/2011 | Cleveland |
| 7,910,833 B2 | 3/2011 | McGinley et al. |
| 7,940,504 B2 | 5/2011 | Spitaels et al. |
| 7,960,648 B2 | 6/2011 | McGinley et al. |
| 7,963,774 B2 | 6/2011 | Shiff et al. |
| 7,964,989 B1 | 6/2011 | Puschnigg et al. |
| 7,965,174 B2 | 6/2011 | Wong et al. |
| 7,973,425 B2 | 7/2011 | Chen |
| 7,978,447 B2 | 7/2011 | Baxter |
| 7,982,335 B2 | 7/2011 | Aldag et al. |
| 8,004,115 B2 | 8/2011 | Chapel et al. |
| 8,022,664 B2 | 9/2011 | Shu |
| 8,058,552 B2 | 11/2011 | Kruse et al. |
| 8,087,939 B2 | 1/2012 | Rohrbach et al. |
| 8,093,751 B1 | 1/2012 | Puschnigg et al. |
| 8,105,091 B2 | 1/2012 | Nishihira et al. |
| 8,108,695 B2 | 1/2012 | Love |
| 8,138,626 B2 | 3/2012 | Jonsson et al. |
| 8,140,279 B2 | 3/2012 | Subbloie |
| 8,143,983 B1 | 3/2012 | Lauder et al. |
| 8,172,588 B2 | 5/2012 | Johnson et al. |
| 8,172,589 B2 | 5/2012 | Johnson et al. |
| 8,174,149 B2 | 5/2012 | Chapel et al. |
| 8,177,560 B2 | 5/2012 | Rohrbach et al. |
| 8,207,627 B2 | 6/2012 | Aldag et al. |
| 8,242,359 B2 | 8/2012 | McGinley et al. |
| 8,242,868 B2 | 8/2012 | Lauder et al. |
| 8,251,705 B2 | 8/2012 | Nishihira et al. |
| 8,255,090 B2 | 8/2012 | Frader-Thompson et al. |
| 8,275,561 B2 | 9/2012 | Alles |
| 8,277,254 B2 | 10/2012 | Yamamoto |
| 8,305,737 B2 | 11/2012 | Ewing et al. |
| 8,335,936 B2 | 12/2012 | Jonsson et al. |
| 8,350,406 B2 | 1/2013 | Byrne et al. |
| 8,366,469 B2 | 2/2013 | Carnevali |
| 8,374,729 B2 | 2/2013 | Chapel et al. |
| 8,382,486 B2 | 2/2013 | Lee et al. |
| 8,396,608 B2 | 3/2013 | Subbloie |
| 8,398,409 B2 | 3/2013 | Schmidt |
| 8,410,753 B2 | 4/2013 | Opolka |
| 8,415,826 B2 | 4/2013 | Lee |
| 8,435,042 B2 | 5/2013 | Rohrbach et al. |
| 8,503,149 B2 | 8/2013 | Spitaels et al. |
| 8,514,042 B2 | 8/2013 | Lauder et al. |
| 8,529,274 B2 | 9/2013 | Li et al. |
| 8,535,088 B2 | 9/2013 | Gao et al. |
| 8,558,408 B2 | 10/2013 | Carter |
| 8,564,279 B2 | 10/2013 | Johnson et al. |
| 8,596,881 B2 | 12/2013 | Umeno |
| 8,602,795 B2 | 12/2013 | Hsu |
| 8,604,914 B2 | 12/2013 | Clarke |
| 8,622,629 B1 | 1/2014 | Umeno |
| 8,622,756 B2 | 1/2014 | Smed |
| 8,651,711 B2 | 2/2014 | Rudisill et al. |
| 8,651,879 B2 | 2/2014 | Stiehl et al. |
| 8,672,228 B1 | 3/2014 | Saini |
| 8,680,709 B2 | 3/2014 | Byrne et al. |
| 8,690,582 B2 | 4/2014 | Rohrbach et al. |
| 8,696,366 B2 | 4/2014 | Chen et al. |
| 8,702,316 B2 | 4/2014 | DiFonzo et al. |
| 8,716,885 B2 | 5/2014 | Pfitzer et al. |
| 8,734,165 B2 | 5/2014 | Neel |
| 8,770,857 B2 | 7/2014 | DiFonzo et al. |
| 8,790,120 B2 | 7/2014 | Wang et al. |
| 8,798,801 B2 | 8/2014 | Subbloie |
| 8,829,921 B2 | 9/2014 | Zhang |
| 8,888,500 B2 | 11/2014 | Gao et al. |
| 8,907,520 B2 | 12/2014 | Chapel et al. |
| 8,915,609 B1 | 12/2014 | Shah et al. |
| 8,992,241 B2 | 3/2015 | Genest et al. |
| 9,004,930 B2 | 4/2015 | Gualino et al. |
| 9,116,308 B2 | 10/2015 | Byrne |
| 9,484,751 B2 | 11/2016 | Byrne et al. |
| 9,531,118 B2 | 12/2016 | Byrne et al. |
| 9,652,014 B2 | 5/2017 | Warwick et al. |
| 10,008,850 B2 | 6/2018 | Byrne et al. |
| 2003/0038717 A1* | 2/2003 | Beaty .............. B60R 22/48 340/457.1 |
| 2004/0130213 A1 | 7/2004 | Goldsholl |
| 2005/0073199 A1 | 4/2005 | Jenkin |
| 2005/0082915 A1 | 4/2005 | Steinberg |
| 2005/0170672 A1 | 8/2005 | Lai et al. |
| 2005/0205543 A1* | 9/2005 | Meckler ............ B23K 9/1336 219/137.71 |
| 2006/0152945 A1 | 7/2006 | Lantzsch et al. |
| 2006/0194467 A1 | 8/2006 | Beasley et al. |
| 2006/0271314 A1 | 11/2006 | Hayes |
| 2007/0086126 A1 | 4/2007 | Baxter |
| 2007/0115695 A1 | 5/2007 | Lou et al. |
| 2007/0184696 A1 | 8/2007 | Melot et al. |
| 2007/0254510 A1 | 11/2007 | DeBey |
| 2008/0090432 A1 | 4/2008 | Patterson et al. |
| 2008/0160810 A1 | 7/2008 | Ferguson et al. |
| 2008/0164768 A1 | 7/2008 | Litwack |
| 2008/0175256 A1 | 7/2008 | Binder |
| 2008/0229819 A1* | 9/2008 | Mayleben ........... F04B 49/06 73/304 C |
| 2009/0045803 A1 | 2/2009 | Schoettle |
| 2009/0058185 A1 | 3/2009 | Schoettle |
| 2009/0091192 A1 | 4/2009 | Robertson et al. |
| 2009/0234512 A1 | 9/2009 | Ewing et al. |
| 2009/0239392 A1 | 9/2009 | Sumitomo et al. |
| 2009/0261661 A1 | 10/2009 | Finneran |
| 2009/0267420 A1 | 10/2009 | Kristensen |
| 2009/0295233 A1 | 12/2009 | McGinley et al. |
| 2009/0323257 A1 | 12/2009 | Sand et al. |
| 2010/0020452 A1 | 1/2010 | Gandolfi |
| 2010/0033024 A1* | 2/2010 | Crucs ............... H02H 3/12 307/112 |
| 2010/0070217 A1 | 3/2010 | Shimada |
| 2010/0079001 A1 | 4/2010 | Lee et al. |
| 2010/0085894 A1 | 4/2010 | Johnson et al. |
| 2010/0096925 A1 | 4/2010 | Lee et al. |
| 2010/0144164 A1 | 6/2010 | Wang et al. |
| 2010/0145542 A1 | 6/2010 | Chapel et al. |
| 2010/0152912 A1 | 6/2010 | Huang |
| 2010/0191487 A1 | 7/2010 | Rada et al. |
| 2010/0214109 A1 | 8/2010 | Reynolds et al. |
| 2010/0225167 A1 | 9/2010 | Stair et al. |
| 2010/0238003 A1 | 9/2010 | Chan |
| 2010/0256828 A1 | 10/2010 | Wang |
| 2010/0280774 A1 | 11/2010 | Ewing et al. |
| 2010/0305773 A1 | 12/2010 | Cohen |
| 2010/0314226 A1 | 12/2010 | Patel et al. |
| 2010/0314942 A1 | 12/2010 | Talkin et al. |
| 2010/0328849 A1 | 12/2010 | Ewing et al. |

(56) References Cited

U.S. PATENT DOCUMENTS

| | | |
|---|---|---|
| 2011/0010006 A1* | 1/2011 | Tani .................. B25J 9/1674 700/245 |
| 2011/0012427 A1 | 1/2011 | Craig et al. |
| 2011/0015795 A1 | 1/2011 | Boyer et al. |
| 2011/0022289 A1 | 1/2011 | Hofbauer |
| 2011/0028006 A1 | 2/2011 | Shah et al. |
| 2011/0029145 A1 | 2/2011 | Dong |
| 2011/0031806 A1 | 2/2011 | Altonen et al. |
| 2011/0072289 A1 | 3/2011 | Kato |
| 2011/0077788 A1 | 5/2011 | Chan et al. |
| 2011/0100702 A1 | 5/2011 | Hayes et al. |
| 2011/0101777 A1 | 5/2011 | Jansma |
| 2011/0119515 A1 | 5/2011 | Sadwick et al. |
| 2011/0121660 A1 | 5/2011 | Azancot et al. |
| 2011/0141634 A1* | 6/2011 | Caamano ............ B65H 75/40 361/42 |
| 2011/0163600 A1 | 7/2011 | Garb et al. |
| 2011/0166710 A1 | 7/2011 | Kordik et al. |
| 2011/0182012 A1 | 7/2011 | Hilton et al. |
| 2011/0184581 A1 | 7/2011 | Storch et al. |
| 2011/0185194 A1 | 7/2011 | Lin et al. |
| 2011/0185198 A1 | 7/2011 | Ukita et al. |
| 2011/0185303 A1 | 7/2011 | Katagi et al. |
| 2011/0202193 A1 | 8/2011 | Craig et al. |
| 2011/0231320 A1 | 9/2011 | Irving |
| 2011/0260538 A1 | 10/2011 | Huang |
| 2011/0260555 A1 | 10/2011 | McGinley |
| 2011/0282497 A1 | 11/2011 | Josephson et al. |
| 2012/0010833 A1 | 1/2012 | Alro |
| 2012/0028505 A1 | 2/2012 | Weber et al. |
| 2012/0049931 A1 | 3/2012 | Yamada |
| 2012/0059529 A1 | 3/2012 | Marivoet et al. |
| 2012/0078670 A1 | 3/2012 | Yamamura et al. |
| 2012/0080949 A1 | 4/2012 | Gelonese |
| 2012/0086562 A1 | 4/2012 | Steinberg |
| 2012/0089263 A1 | 4/2012 | Park et al. |
| 2012/0095610 A1 | 4/2012 | Chapel et al. |
| 2012/0096291 A1 | 4/2012 | Guang |
| 2012/0109395 A1 | 5/2012 | Finch et al. |
| 2012/0127637 A1 | 5/2012 | Byrne |
| 2012/0128078 A1 | 5/2012 | Billingsley et al. |
| 2012/0139341 A1 | 6/2012 | Jouper |
| 2012/0177322 A1 | 7/2012 | Schwandt et al. |
| 2012/0177323 A1 | 7/2012 | Schwandt et al. |
| 2012/0177324 A1 | 7/2012 | Schwandt et al. |
| 2012/0177325 A1 | 7/2012 | Schwandt et al. |
| 2012/0183258 A1 | 7/2012 | Schwandt et al. |
| 2012/0183259 A1 | 7/2012 | Schwandt et al. |
| 2012/0183260 A1 | 7/2012 | Schwandt et al. |
| 2012/0183261 A1 | 7/2012 | Schwandt et al. |
| 2012/0183262 A1 | 7/2012 | Schwandt et al. |
| 2012/0189155 A1 | 7/2012 | Gabara |
| 2012/0206090 A1 | 8/2012 | Hyun-Jun et al. |
| 2012/0252231 A1 | 10/2012 | Kall |
| 2012/0265361 A1 | 10/2012 | Billingsley et al. |
| 2012/0271471 A1 | 10/2012 | Lee et al. |
| 2012/0278640 A1 | 11/2012 | Caglianone |
| 2012/0295451 A1 | 11/2012 | Hyun-Jun et al. |
| 2012/0316808 A1 | 12/2012 | Frader-Thompson et al. |
| 2012/0322323 A1 | 12/2012 | Fowler |
| 2013/0026853 A1 | 1/2013 | Chen et al. |
| 2013/0040470 A1 | 2/2013 | Gao et al. |
| 2013/0050958 A1 | 2/2013 | Bdeir |
| 2013/0073060 A1 | 3/2013 | Dawley et al. |
| 2013/0083805 A1 | 4/2013 | Lu et al. |
| 2013/0088186 A1 | 4/2013 | Hsieh |
| 2013/0093249 A1 | 4/2013 | Chapel et al. |
| 2013/0099567 A1 | 4/2013 | Pfitzer |
| 2013/0144453 A1 | 6/2013 | Subbloie |
| 2013/0210244 A1 | 8/2013 | DiFonzo et al. |
| 2013/0323941 A1 | 12/2013 | Zeliff |
| 2013/0343025 A1 | 12/2013 | Bdeir |
| 2014/0011375 A1 | 1/2014 | Lin |
| 2014/0049911 A1 | 2/2014 | Corbin et al. |
| 2014/0065846 A1 | 3/2014 | Poh et al. |
| 2014/0087569 A1 | 3/2014 | Lee |
| 2014/0087581 A1 | 3/2014 | Umeno |
| 2014/0099801 A1 | 4/2014 | Liao |
| 2014/0120746 A1 | 5/2014 | Persion et al. |
| 2014/0148018 A1 | 5/2014 | Kim |
| 2014/0153265 A1 | 6/2014 | Rudisill et al. |
| 2014/0162468 A1 | 6/2014 | Kim |
| 2014/0170864 A1 | 6/2014 | Hwang |
| 2014/0179126 A1 | 6/2014 | Gao et al. |
| 2014/0187057 A1 | 7/2014 | Murtagian et al. |
| 2014/0192494 A1 | 7/2014 | Liang et al. |
| 2015/0071675 A1 | 3/2015 | Suzaki |
| 2015/0118868 A1 | 4/2015 | Choi et al. |
| 2015/0171649 A1 | 6/2015 | Kim et al. |
| 2015/0194764 A1 | 7/2015 | Magana et al. |
| 2015/0372430 A1* | 12/2015 | Foster .................. H03K 17/78 307/117 |
| 2018/0181779 A1* | 6/2018 | Staraj .................. G06K 19/0723 |

FOREIGN PATENT DOCUMENTS

| | | |
|---|---|---|
| CN | 101907870 | 12/2010 |
| CN | 201698189 | 1/2011 |
| FR | 2938383 | 5/2010 |
| JP | 7221581 | 8/1995 |
| WO | 2006009672 A1 | 1/2006 |
| WO | 2010033563 A1 | 3/2010 |
| WO | 2012036713 | 3/2012 |
| WO | 2012036716 | 3/2012 |
| WO | 2012078526 | 6/2012 |
| WO | 2012106215 | 8/2012 |
| WO | 2012158616 | 11/2012 |
| WO | 2013003781 | 1/2013 |
| WO | 2013022899 | 2/2013 |
| WO | 2013165049 | 11/2013 |
| WO | 2014010781 | 1/2014 |
| WO | 2014021847 | 2/2014 |
| WO | 2015168221 | 11/2015 |

OTHER PUBLICATIONS

Microchip Technology, Inc., "PIC12F675 Data Sheet" located at http://www.microchip.com/wwwproducts/Devices.aspx?dDocName=en010114, dated Apr. 30, 2010.

Excerpt of UL Household and Commercial Furnishings Standard 962, dated Jun. 11, 2010.

"MagSafe." Wikipedia, n. d. Web. Feb. 26, 2015. <http://en.wikipedia.org/wiki/MagSafe>, published on or before Feb. 23, 2015.

"Magnetic Connector Power Cord", <http://www.alibaba.com/showroom/magnetic-power-connector.html>, published on or before Feb. 26, 2015.

* cited by examiner

ELECTRICAL POWER CORD WITH INTELLIGENT SWITCHING

CROSS REFERENCE TO RELATED APPLICATION

The present application claims the filing benefits of U.S. provisional application Ser. No. 62/405,480, filed Oct. 7, 2016, which is hereby incorporated by reference herein in its entirety.

FIELD OF THE INVENTION

The present invention relates to electrical power cords for supplying electrical power to appliances, electronics, electrical outlets, and the like.

BACKGROUND OF THE INVENTION

Control of electrical power consumption in work areas including office spaces, medical facilities, and hospitality areas is becoming more important as operators of such areas look for ways to reduce energy consumption, and in particular needless energy consumption. For example, in air conditioned work spaces that are maintained as a preselected temperature, some users of that work area may be uncomfortably cool and will install space heaters for their particular work areas, which consume large amounts of power to heat areas that a larger HVAC system is consuming energy to cool, and which will continue to consume large amounts of power if they are not turned off when they are not in use. Other appliances or devices may consume significantly less power than electric space heaters, but these other devices often consume electrical power even when switched off, and when large work areas with many outlets are considered, the power uselessly consumed by many appliances or devices can add up to significant energy consumption even during periods of non-use.

SUMMARY OF THE INVENTION

The present invention provides an electrical power cord with one or more built-in sensors that feed into a switching circuit, which selectively de-energizes a power output end of the power cord when certain criteria are met, such as time-of-day and/or day-of-week, lack of motion detection by a motion sensor for an elapsed period of time, or power consumption at the power output end reaching a predetermined threshold. The electrical power cord of the present invention may be used to achieve compliance with electrical efficiency standards such as In one form of the present invention, an electrical power cord with intelligent switching capability includes an electrical power input, an electrical power input, a power cord disposed therebetween, and a switching circuit along the power cord. The electrical power input receives electrical power from a power source, and the electrical power output conveys electrical power to an electrical consumer such as an electrical appliance or an electronic device. The switching circuit is disposed along the power cord and is operable to selectively establish or break electrical continuity along at least one of the electrical conductors in response to a sensor such as an occupancy sensor or a power consumption sensor (e.g., an ammeter or other electricity sensor).

In another form of the present invention, an electrical power cord with intelligent switching capability, includes an electrical power input cord, and electrical power output cord, and a switching circuit disposed between the power input and output cords. The input cord is configured to receive electrical power from a power source such as a wall outlet or floor outlet. The output cord is configured to convey electrical power to an electrical consumer, such as an electrical appliance, electronics equipment, or a rechargeable portable electronic device. The switching circuit includes an electrical switch and a controller in communication with an occupancy sensor and/or an electrical power consumption sensor. The electrical switch is operable in response to the controller and can be closed by the controller to electrically connect the electrical power input cord to the electrical power output cord. The occupancy sensor can detect the presence of a user in the vicinity of the electrical power cord. The electrical power consumption sensor is operable to detect electrical power consumption by an electrical consumer that is electrically coupled to the electrical power output cord.

According to one aspect, the occupancy sensor is incorporated into the switching circuit, and is operable to generate an occupancy signal in response to detecting the presence of a user in the vicinity of the switching circuit. Optionally, the occupancy sensor is a passive infrared sensor.

According to another aspect, the switching circuit further includes a timer in communication with the controller. The timer is used to determine or count the amount of time that has elapsed since a termination of the occupancy signal. The controller is operable to open the electrical switch in response to the elapsed time exceeding a predetermined threshold elapsed time.

According to still another aspect, the switching circuit further includes a real-time clock in communication with the controller, and the predetermined threshold elapsed time is determined based on a time signal generated by the real-time clock. Optionally, the timer and real-time clock are combined into a single unit or portion of the switching circuit.

According to a further aspect, the switching circuit includes a wireless communications device that is in electronic communication with the controller and also with the occupancy sensor and/or a remotely located computer. Optionally, the controller is programmable via the wireless communications device. For example, the controller can be programmed with the actual time of day and day of the week, typical work times and typical non-work times on a given day, threshold elapsed time(s), threshold power consumption level(s), and the like. The wireless communications device may also be used to convey power consumption data, recorded by the controller, to another computer, such as a laptop computer used by a systems administrator.

According to another aspect, the occupancy sensor is positioned remotely from the controller, and the occupancy sensor is in wireless electronic communication with the controller via the wireless communications device.

According to a still further aspect, the controller is operable to open the electrical switch in response to an electrical power signal received from the electrical power consumption sensor, when the electrical power signal exceeds a predetermined threshold power consumption value.

According to yet another aspect, the switching circuit further includes a real-time clock in communication with the controller, and the controller is configured to determine or select the predetermined threshold power consumption level based at least in part on a time signal generated by the real-time clock. For example the predetermined threshold power consumption level may be relatively higher during work hours as determined by the controller in communication with the real-time clock, and the predetermined threshold power consumption level may be relatively lower during non-work hours.

In another form of the present invention, a method is provided for selectively energizing and de-energizing a power output end of an electrical power extension cord for use in a work area. The method includes connecting an electrical power input end of the electrical power cord to an energized electrical power source, establishing electronic communications between a sensor and a switching circuit along the electrical power cord between the power output end and the power input end, and selectively establishing electrical continuity, at the switching circuit, between the electrical power input end and the power output end in response to the sensor detecting (i) occupancy of the work area in the vicinity of the sensor, and/or (ii) a measured power consumption along the electrical power cord exceeding a threshold value.

According to one aspect, the step of establishing electronic communications between the sensor and the switching circuit includes providing a controller and a wireless communications device at the switching circuit. The switching circuit is in wireless electronic communication with the sensor via the controller and the wireless communications device.

According to another aspect, in which the sensor is an occupancy sensor, the method includes a step of positioning the sensor in the work area at a location that is spaced apart from the electrical power extension cord.

According to still another aspect in which the sensor is an occupancy sensor, the step of establishing electronic communications between the sensor and the switching circuit includes providing a controller at the switching circuit. The method further includes closing a switch of the switching circuit with the controller in response to an occupancy signal received from the occupancy sensor. Optionally, the switch is opened by the controller in response to cessation of the occupancy signal.

According to a further aspect, a timer is provided at the controller, and the timer is operable to calculate an elapsed time from the cessation of the occupancy signal. The step of opening the switch includes delaying the opening the switch until the elapsed time equals or exceeds a predetermined threshold elapsed time. Optionally, a real-time clock is also provided at the controller, the real-time clock generating a time signal, and the step of delaying the opening of the switch includes selecting, with the controller, one of at least two different predetermined threshold elapsed times based on the time signal.

According to yet another aspect, the sensor is a power consumption sensor, and the method further includes providing a timer at the controller, wherein the timer is operable to calculate an elapsed time from the measured power consumption along the electrical power cord exceeding the threshold value. The step of selectively establishing electrical continuity includes opening a switch of the switching circuit with the controller in response to the elapsed time exceeding a predetermined elapsed time. Optionally, a real-time clock is provided at the controller and can generate a time signal, wherein the step of selectively establishing electrical continuity includes selecting, with the controller, one of at least two different predetermined threshold elapsed times based on the time signal.

Therefore, the electrical power cord with intelligent switching capability can selectively de-energizes the power output end of the power cord when certain criteria are met, such as lack of motion detection by a motion sensor for an elapsed period of time, or detected power consumption at the power output end reaching a predetermined high or low threshold. Optionally, time-of-day and/or day-of-week may be used as a criteria. The electrical power cord may be used to selectively supply electrical energy to power and/or data outlets, or appliances or other electrical consumers during periods of use, while limiting or preventing energy consumption during periods when they are not in use.

These and other objects, advantages, purposes and features of the present invention will become apparent upon review of the following specification in conjunction with the drawings.

DESCRIPTION OF THE PREFERRED EMBODIMENTS

Referring now to the drawing and the illustrative embodiments depicted therein, an electrical power cord 10 includes an intelligent switching circuit or controller 12 and is provided for use in a residential or work environment, such as one containing a furniture article such as a table 13 (FIG. 1), while permitting automatic control of electrical power consumption in such environments. The electrical power cord 10 operates to reduce unnecessary electrical energy consumption by using one or more sensors associated with intelligent switching circuit 12 to selectively energize and de-energize a power output end 14 of the power cord 10. Output end 14 may be connected to an electrical power unit 15 having one or more high voltage AC power outlets 15a and/or one or more low voltage DC power outlets 15b, and/or may be connected directly or through detachable connectors to an electrical consumer such as an electrical or electronic appliance or device.

Figure 1:
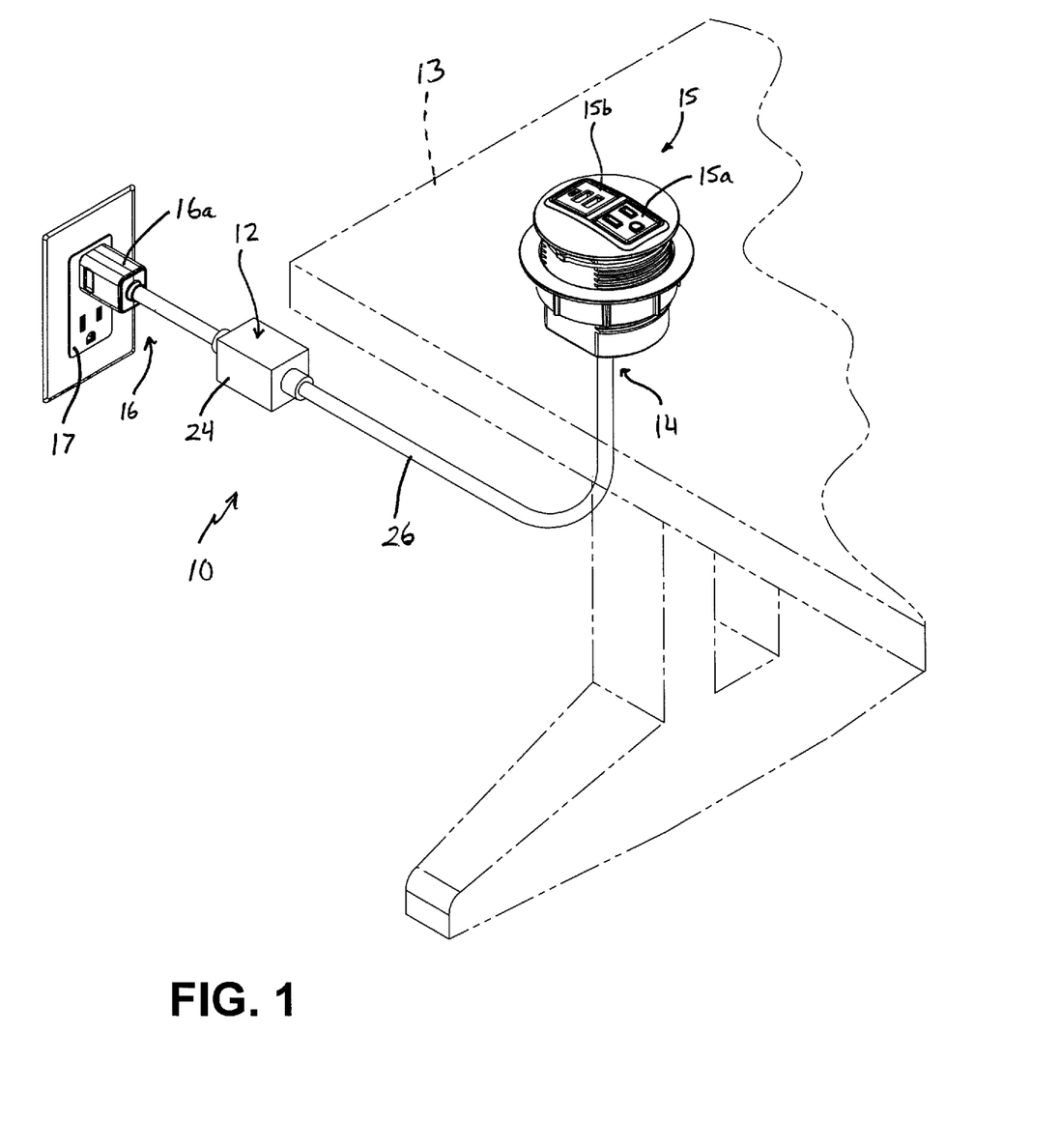
FIG. 1 is a perspective view of an electrical power cord with intelligent switching device in accordance with the present invention, shown in an operating environment.
Figure 2A:
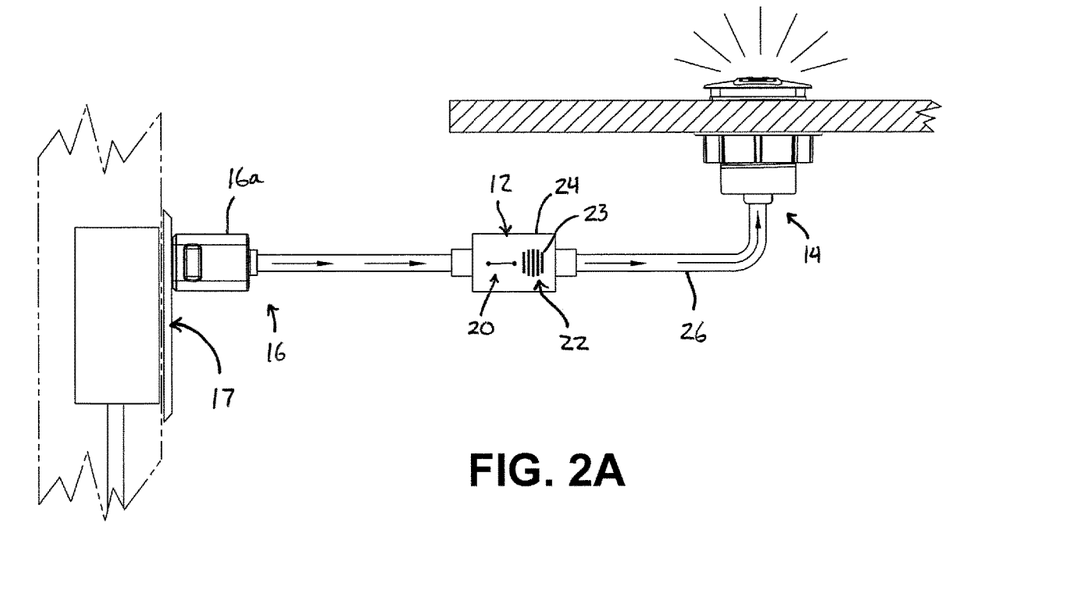
FIGS. 2A and 2B are side elevations of the electrical power cord of FIG. 1, shown in energized and de-energized states, respectively.
Figure 2B:
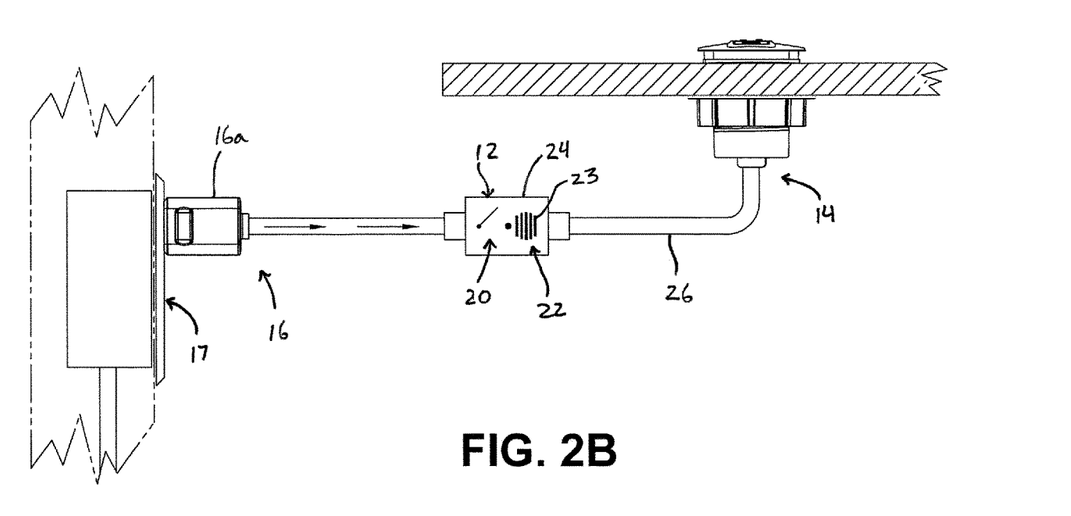
Figure 4:
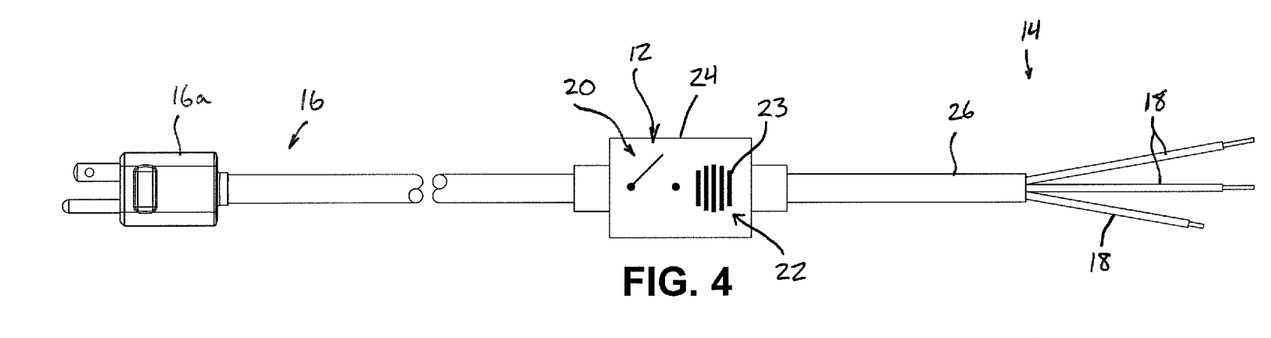
FIGS. 4-6 are side elevations of alternative electrical power cords with intelligent switching devices.
Figure 5:
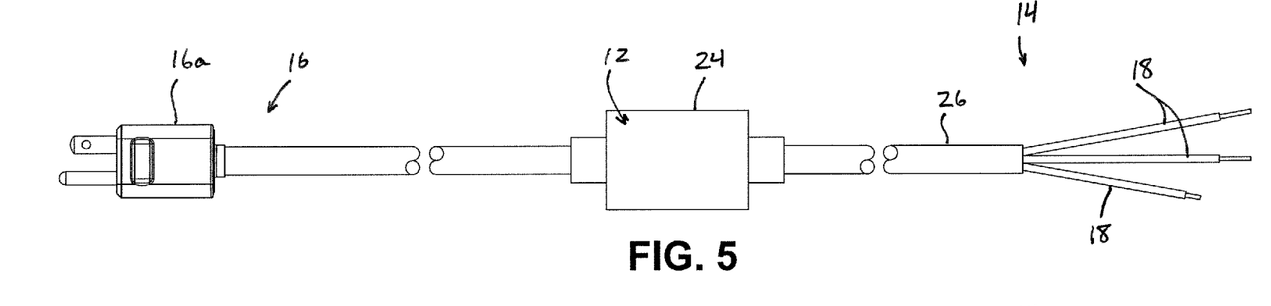

In the illustrated embodiment, a power input end portion 16 of electrical power cord 10 is fitted with a conventional 110V AC power plug 16a with line, neutral, and ground contacts. It will be appreciated that substantially any electrical plug may be selected as appropriate for a given electrical system or receptacle 17 to which power cord 10 is to be connected (FIGS. 1-2B). For example, any 110V AC power plug, any 220V AC power plug, or even DC power plugs or other connectors may be used in the case of low voltage DC power systems, without departing from the spirit and scope of the present invention. Similarly, power output end 14 may be terminated with bare wires 18 (FIGS. 4-6) for connection to an electrical outlet or for direct connection to an appliance or other electrical power consumer. For example, power output end 14 may be terminated at substantially any of the electrical outlets or electrical and/or data units disclosed in commonly-owned U.S. Pat. Nos. 9,438,070; 9,368,924; 9,220,342; 9,148,006; 8,721,124; 8,616,921; 8,480,415; 8,480,429; D736,159; D719,508; D714,726; and D685,741, all of which are hereby incorporated herein by reference in their entireties.

Figure 6:
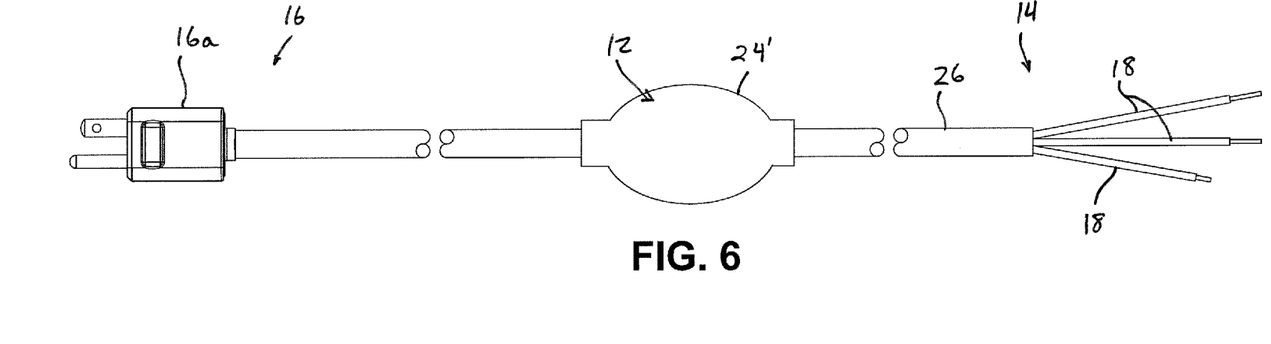

Referring to FIGS. 2A-4, intelligent switching circuit 12 includes a relay switch 20 that is operable in response to a sensor 22, which may be an occupancy sensor that generates a signal indicative of whether the area surrounding power cord 10 is occupied or unoccupied by a user or potential user of an electrical consumer coupled to power output end 14. In the illustrated embodiment of FIG. 3, sensor 22 is a passive infrared (PIR) sensor for sensing motion. Slots or louvers 23 may be formed in a housing 24 that contains intelligent switching circuit 12 (FIGS. 2A, 2B and 4), which slots or louvers 23 provide sensor 22 with a "view" of (i.e., the ability to detect motion in) a region outside of housing 24. In the illustrated embodiments of FIGS. 1-5, housing 24 is a parallelepiped having six square or rectangular faces, but it will be appreciated that other shapes are possible, such as a spheroidal housing 24' as shown in FIG. 6.

Relay switch 20 may default to an open condition in which power output end 14 is de-energized, only closing to energize power output end 14 when the sensor 22 detects occupancy or detects when power consumption at power output end 14 has exceeded some predetermined threshold value. When power consumption at power output end 14 is used as a relay switch activation criteria, this may be based on the rate of power consumption exceeding a threshold value deemed appropriate for a given work area. For example, if the operator of a work area determines that the power consumption of mobile phone chargers, lamps, computers, computer monitors, and printers is acceptable, but the power consumption of personal refrigerators or electric space heaters is not acceptable, the intelligent switching circuit 12 may be programmed to open relay switch 20 when the power consumption exceeds a predetermined value which is less than the power consumed than the larger devices and more than the power consumed by the smaller devices, at any day or time, or only during certain days or times.

By further example, the operator of a work area may wish to accommodate the comfort of individual users of the work area by permitting limited use of space heaters during normal work hours, but may not wish to waste energy on such devices if they are accidentally left on during non-work hours. It is further envisioned that the operator of a work area may wish to have power cord 10 automatically de-energize power output end 14 if less than a threshold low amount of power is being consumed, such as the so-called "vampire power" consumed by certain electronic devices (e.g., computers and monitors, radios, DC transformers) when they are switched off or otherwise not in use. It may be particularly beneficial to equip electrical appliances that receive intermittent use, such as televisions and radios, with power cord 10, in order to limit or prevent the power consumption by such devices during periods when they are switched off and therefore not in use, or when no users have been detected in their vicinity for a predetermined length of time. Thus, it will be appreciated that providing a programmable intelligent switching circuit 12 can enable users or operators to account for different types of acceptable power consumption, while substantially reducing the incidence of useless energy consumption.

Switching circuit 12 may include a real-time clock that can be used to provide different functions, such as preventing switch 20 from opening during normal work hours in an office, while permitting switch 20 to open after normal work hours provided that a predetermined amount of time has elapsed since sensor 22 detected motion in its operating environment, or since sensor 22 ceased to generate an occupancy signal. Optionally, intelligent switching circuit 12 may be programmed to open switch 20 any time that a predetermined amount of time has elapsed since sensor 22 detected motion in its operating environment, regardless of the time of day. A real-time clock or timer may also be used in conjunction with an occupancy sensor so as to limit or prevent unnecessary energizing of power output end 14, such as when security or cleaning personnel are present in an area that is monitored by the sensor 22 outside of normal hours when the electrical power cord 10 would be in use for its designated purpose(s).

Optionally, the predetermined amount of elapsed time between the last occupancy signal received from sensor 22 and opening of the switch 20 can be different depending on whether it is during regular work hours or non-work hours. For example, if power cord 10 were in use in an office area having typical work hours of 8:00 am to 5:00 pm, intelligent switching circuit 12 may be programmed to open switch 20 once one or two hours have elapsed since the last occupancy signal was generated by sensor 22, during the hours ranging from 7:00 am to 6:00 pm, so that a user may charge a portable electronic device or run other electrical devices for at least a limited time while temporarily away from their work area, whereas during the hours ranging from 6:00 pm to 7:00 am the intelligent switching circuit 12 may be programmed to open switch 20 after only five or ten minutes have elapsed since cessation of the occupancy signal (i.e., since the last occupancy signal was generated by sensor 22). Thus, power consumption can be reduced or substantially prevented during typical non-working hours unless a user is actively using the area during those non-working hours.

Optionally, the sensor may be a power consumption sensor that determines if power consumed at power output end 14 exceeds (below or above) a predetermined threshold value. For example, the intelligent switching circuit 12 may include a real-time clock and be programmable to open switch 20 at a predetermined time of day regardless of power consumption at that time, or may be programmable to open switch 20 at a predetermined time of day but only if there is detectable power consumption, or only if power consumption is detected as being above or below a predetermined threshold at that time of day. For example, if power cord 10 were in use in an office area to power a 1200-watt space heater during typical work hours of 8:00 am to 5:00 pm, intelligent switching circuit 12 may be programmed to open switch 20 between the hours of 6:00 pm and 7:00 am to ensure that no power is consumed at output end 14 during those thirteen hours, or switching circuit 12 may be programmed to open switch 20 between the hours of 6:00 pm and 7:00 am only if power consumption in excess of 900-watts is detected. Such programming would allow power cord to supply electrical power to devices such as phone chargers, task lights, laptop computers, and other relatively small power consumers, but would prevent the 1200-watt space heater from running during that time period. By further example, if the power sensor determined that power cord 10 was supplying only a few watts of power during non-working hours, and this was below a threshold minimum, the power consumption may be considered "vampire power" (power consumed by electrical transformers or devices that are switched off, but continue to draw some power), and switch 20 may consequently be opened. Optionally, both high and low power consumption thresholds may be set for switching circuit 12.

Figure 3:
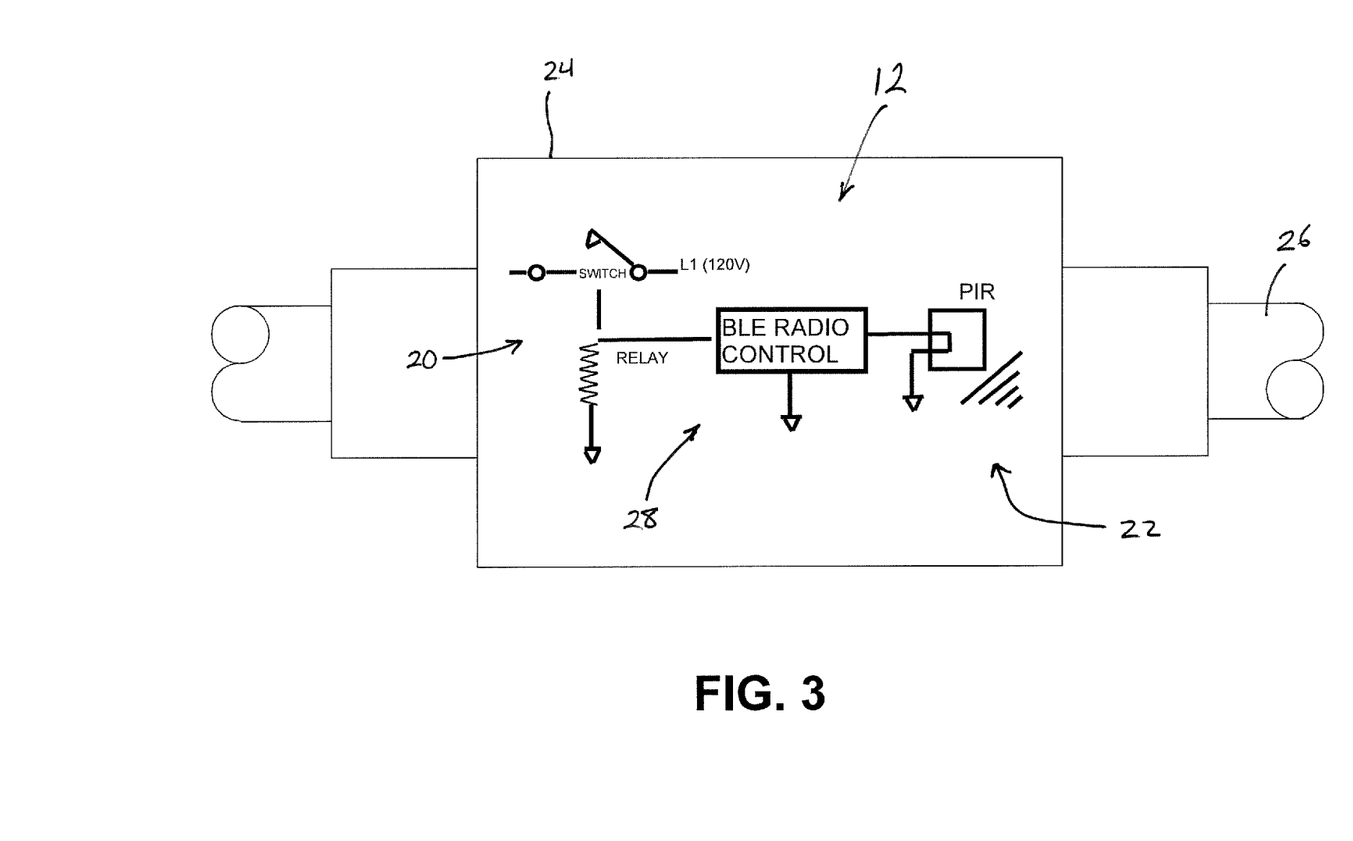
FIG. 3 is a diagrammatic view of the intelligent switching circuit of the electrical power cord.

In the illustrated embodiment, and as best shown in FIG. 3, sensor 22 is mounted directly in a housing 24 that contains intelligent switching circuit 12. However, in some applications the intelligent switching circuit 12 may be positioned in a location where a sensor 22 contained in housing 24 may not be capable of detecting occupancy. For example, if intelligent switching circuit 12 is supported in a tray or routed between a furniture article and a wall or wall divider, or if sensor 22 is a directional sensor and is oriented in such a way that prevents the sensor from accurately detecting occupancy, then the sensor 22 would potentially be rendered ineffective. Therefore, it is envisioned that an occupancy sensor 22 may be positioned in a more conspicuous location, such as atop a work surface or in an electrical outlet or power and/or data unit such those disclosed in the commonly-owned patents and pending applications listed above.

In such an arrangement, the occupancy sensor would communicate with the relay switch via wireless communications protocol, such as 2.4 GHz ZIGBEE® protocol, BLUETOOTH® protocol, WiFi protocol, or substantially any other wireless communications protocol, or via wired communications though a power cord output section 26, which is between intelligent switching circuit 12 and power output end 14. For example, a wireless communications device in the form of a BLUETOOTH® Low Energy (BLE) radio control 28 (FIG. 3) may be provided as part of intelligent switching circuit 12, for wireless communications between switching circuit 12 and a remotely located sensor (not shown). Optionally, one or more remotely-located sensors may be used to signal the intelligent switching circuit 12 whether to open or close relay switch 20, such as in a manner more fully described in commonly-owned U.S. Pat. No. 9,652,014, which is hereby incorporated herein by reference in its entirety. BLE radio control 28 may also permit wireless programming of threshold power consumption values, actual time of day, elapsed times at which switch 20 is to be opened under certain conditions or at different times of day, and motion sensor sensitivity, for example, and may also be used to communicate (upload) saved power consumption data to another (remotely located) computer.

Accordingly, the present invention provides an electrical power cord with one or more associated sensors that send a signal to a switching circuit, which selectively de-energizes a power output end of the power cord when certain criteria are met, such as time-of-day and/or day-of-week, lack of motion detection by a motion sensor for an elapsed period of time, or power consumption at the power output end reaching a predetermined high or low threshold. The electrical power cord may be used to selectively supply electrical energy to power and/or data outlets, or appliances or other electrical consumers during periods of use, while limiting or preventing energy consumption during periods when they are not in use.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power extension cord with intelligent switching capability, comprising:
   an electrical power input cord adapted to receive electrical power from a power source;
   an electrical power output cord adapted to convey electrical power to an electrical consumer;
   a switching circuit disposed between said power input cord and said power output cord, said switching circuit comprising:
   a controller in communication with at least one chosen from (i) an occupancy sensor that is operable to detect a physical presence of a user in the vicinity of said electrical power cord, and (ii) an electrical power consumption sensor that is operable to detect and measure electrical power consumption at said electrical power output cord; and
   an electrical switch that is operable in response to said controller and adapted to electrically connect said electrical power input cord to said electrical power output cord when said switch is closed in response to said controller.

2. The electrical power cord of claim 1, wherein said controller comprises said occupancy sensor, wherein said occupancy sensor is operable to generate an occupancy signal in response to detecting the physical presence of the user, and wherein said occupancy sensor is further operable to terminate the occupancy signal when the user is no longer physically present.

3. The electrical power cord of claim 2, wherein said occupancy sensor comprises a passive infrared sensor configured to sense motion.

4. The electrical power cord of claim 1, further in combination with said occupancy sensor, wherein said occupancy sensor is operable to generate an occupancy signal in response to detecting the physical presence of the user, and wherein said controller is operable to close said electrical switch in response to receiving the occupancy signal.

5. The electrical power cord of claim 4, wherein said switching circuit further comprises a timer in communication with said controller, wherein said timer is operable to determine an elapsed time following a termination of the occupancy signal, and wherein said controller is operable to open said electrical switch in response to the elapsed time exceeding a predetermined threshold elapsed time.

6. The electrical power cord of claim 5, wherein said switching circuit further comprises a real-time clock in communication with said controller, wherein the predetermined threshold elapsed time is determined based on a time signal generated by said real-time clock.

7. The electrical power cord of claim 1, wherein said switching circuit further comprises a wireless communications device that is in electronic communication with said controller and with at least one chosen from the occupancy sensor and a remotely located computer.

8. The electrical power cord of claim 7, wherein said controller is programmable via said wireless communications device.

9. The electrical power cord of claim 7, further in combination with said occupancy sensor, wherein said occupancy sensor is positioned remotely from said controller, and wherein said occupancy sensor is in wireless electronic communication with said controller via said wireless communications device.

10. The electrical power cord of claim 1, further in combination with said electrical power consumption sensor, wherein said controller is operable to open said electrical switch in response to an electrical power signal from said electrical power consumption sensor exceeding a predetermined threshold power consumption value.

11. The electrical power cord of claim 10, wherein said switching circuit further comprises a real-time clock in communication with said controller, wherein said controller is configured to determine the predetermined threshold power consumption value based on a time signal generated by said real-time clock.

12. A method of selectively energizing and de-energizing a power output end of an electrical power extension cord for use in a work area, said method comprising:
- connecting an electrical power input end of the electrical power cord to an energized electrical power source;
- establishing electronic communications between a sensor and a switching circuit that is disposed along the electrical power cord;
- selectively establishing electrical continuity, at the switching circuit, between the electrical power input end and the power output end in response to the sensor detecting at least one chosen from (i) a physical occupancy of the work area in the vicinity of the sensor, and (ii) a measured power consumption value along the electrical power cord exceeding a threshold value.

13. The method of claim 12, wherein said establishing electronic communications between the sensor and the switching circuit comprises providing a controller and a wireless communications device at the switching circuit, wherein the switching circuit is in wireless electronic communication with the sensor via the controller and the wireless communications device.

14. The method of claim 13, wherein the sensor comprises an occupancy sensor, and wherein said method comprises positioning the sensor in the work area at a location that is spaced apart from the electrical power extension cord.

15. The method of claim 12, wherein the sensor comprises an occupancy sensor, said establishing electronic communications between the sensor and the switching circuit comprises providing a controller at the switching circuit, and said method further comprises closing a switch of the switching circuit with the controller in response to an occupancy signal received from the occupancy sensor, and wherein the occupancy sensor outputs the occupancy signal while the work area is physically occupied and terminates the occupancy signal when the work area is no longer physically occupied.

16. The method of claim 15, further comprising opening the switch with the controller in response to cessation of the occupancy signal.

17. The method of claim 16, further comprising providing a timer at the controller, wherein the timer is operable to calculate an elapsed time from the cessation of the occupancy signal, wherein said opening the switch comprises delaying said opening the switch until the elapsed time equals or exceeds a predetermined threshold elapsed time.

18. The method of claim 17, further comprising providing a real-time clock at the controller, and generating a time signal with the real-time clock, wherein said delaying said opening the switch comprises selecting, with the controller, one of at least two different predetermined threshold elapsed times based on the time signal.

19. The method of claim 12, wherein the sensor comprises a power consumption sensor, and said method comprises providing a timer at the controller, wherein the timer is operable to calculate an elapsed time from the measured power consumption value along the electrical power cord exceeding the threshold value, and said selectively establishing electrical continuity comprises opening a switch of the switching circuit with the controller in response to the elapsed time exceeding a predetermined elapsed time.

20. The method of claim 19, further comprising providing a real-time clock at the controller and generating a time signal with the real-time clock, wherein said selectively establishing electrical continuity comprises selecting, with the controller, one of at least two different predetermined threshold elapsed times based on the time signal.

* * * * *

UNITED STATES PATENT AND TRADEMARK OFFICE
CERTIFICATE OF CORRECTION

PATENT NO.         : 10,541,557 B2
APPLICATION NO.    : 15/727071
DATED              : January 21, 2020
INVENTOR(S)        : Norman R. Byrne and Peter J. Maher Page 1 of 1

It is certified that error appears in the above-identified patent and that said Letters Patent is hereby corrected as shown below:

In the Specification

Summary of the Invention

Column 1
Line 51, insert -- ASHRAE 90.1, Title 21. -- after "efficiency standards such as"

Signed and Sealed this
Fifth Day of January, 2021

Andrei Iancu
*Director of the United States Patent and Trademark Office*